(12) United States Patent
Lee

(10) Patent No.: US 7,420,555 B1
(45) Date of Patent: Sep. 2, 2008

(54) METHOD AND APPARATUS FOR TRANSFORMING POINT CLOUD DATA TO VOLUMETRIC DATA

(75) Inventor: Michael J. Lee, Richmond (CA)

(73) Assignee: NGRAIN (Canada) Corporation, Vancouver (CA)

( * ) Notice: Subject to any disclaimer, the term of this patent is extended or adjusted under 35 U.S.C. 154(b) by 0 days.

(21) Appl. No.: 11/943,491

(22) Filed: Nov. 20, 2007

Related U.S. Application Data

(63) Continuation of application No. 10/309,411, filed on Dec. 2, 2002, now Pat. No. 7,317,456.

(51) Int. Cl.
*G06T 17/00* (2006.01)

(52) U.S. Cl. ..................................... 345/424
(58) Field of Classification Search .................. None
See application file for complete search history.

(56) References Cited

U.S. PATENT DOCUMENTS

| | | | |
|---|---|---|---|
| 4,987,554 A | | 1/1991 | Kaufman |
| 5,113,357 A | * | 5/1992 | Johnson et al. ............. 345/424 |
| 5,557,711 A | * | 9/1996 | Malzbender ................ 345/422 |
| 5,570,460 A | | 10/1996 | Ramanujam |
| 5,594,842 A | * | 1/1997 | Kaufman et al. ............ 345/424 |
| 5,760,781 A | | 6/1998 | Kaufman |
| 5,781,194 A | * | 7/1998 | Ponomarev et al. ......... 345/424 |
| 5,886,702 A | * | 3/1999 | Migdal et al. ............... 345/423 |
| 5,898,793 A | * | 4/1999 | Karron et al. ............... 382/131 |
| 5,990,904 A | | 11/1999 | Griffin |
| 6,191,794 B1 | * | 2/2001 | Priem et al. ................ 345/582 |
| 6,219,059 B1 | | 4/2001 | Argiro |
| 6,278,460 B1 | | 8/2001 | Myers |
| 6,476,807 B1 | * | 11/2002 | Duluk et al. ............... 345/421 |
| 6,690,820 B2 | | 2/2004 | Lees |
| 6,701,006 B2 | * | 3/2004 | Moore et al. ............... 382/154 |
| 6,828,978 B2 | | 12/2004 | Buehler |
| 6,862,025 B2 | * | 3/2005 | Buehler ..................... 345/424 |

(Continued)

OTHER PUBLICATIONS

Hoppe et al. Surface Reconstruction from Unorganized Points. Proceedings of the 19th Annual Conference on Computer Graphics and Interactive Techniques. 1992.*

(Continued)

*Primary Examiner*—Ulka Chauhan
*Assistant Examiner*—Peter-Anthony Pappas
(74) *Attorney, Agent, or Firm*—Christensen O'Connor Johnson Kindness PLLC

(57) ABSTRACT

A method and apparatus are provided for transforming an irregular, unorganized cloud of data points (100) into a volumetric data or "voxel" set (120). Point cloud (100) is represented in a 3D Cartesian coordinate system having an x-axis, a y-axis and a z-axis. Voxel set (120) is represented in an alternate 3D Cartesian coordinate system having an x'-axis, a y'-axis, and a z'-axis. Each point P(x, y, z) in the point cloud (100) and its associated set of attributes, such as intensity or color, normals, density and/or layer data, are mapped to a voxel V(x', y', z') in the voxel set (120). Given that the point cloud has a high magnitude of points, multiple points from the point cloud may be mapped to a single voxel. When two or more points are mapped to the same voxel, the disparate attribute sets of the mapped points are combined so that each voxel in the voxel set is associated with only one set of attributes.

43 Claims, 10 Drawing Sheets

U.S. PATENT DOCUMENTS

| | | | |
|---|---|---|---|
| 6,968,299 B1* | 11/2005 | Bernardini et al. | 703/2 |
| 7,133,041 B2* | 11/2006 | Kaufman et al. | 345/419 |
| 2002/0113752 A1 | 8/2002 | Sullivan | |
| 2002/0118206 A1* | 8/2002 | Knittel | 345/557 |
| 2003/0052875 A1 | 3/2003 | Salomie | |
| 2003/0160788 A1* | 8/2003 | Buehler | 345/422 |
| 2003/0160798 A1* | 8/2003 | Buehler | 345/581 |
| 2005/0212800 A1 | 9/2005 | Petrovic | |

OTHER PUBLICATIONS

Jeong et al. Direct Reconstruction of Displaced Subdivision Surface from Unorganized Points. Ninth Pacific Conference on Computer Graphics and Applications. 2001.*

Foley, J.D., et al., "Computer Graphics: Principles and Practice," Addison-Wesley, Reading, Mass., 1996, pp. 660-663.

Foley, J.D., et al., "Computer Graphics: Principles and Practice," Addison-Wesley, Reading, Mass., 1997, pp. 820-826.

Kaufman, A., and E. Shimony, "3D Scan-Conversion Algorithms for Voxel-Based Graphics," Proceedings of ACM Workshop on Interactive 3D Graphics, Oct. 23-24, 1986, pp. 45-76.

Kaufman, A., "Efficient Algorithms for 3D Scan-Conversion of Parametric Curves, Surfaces, and Volumes," Proceedings of the 14th Annual Conference on Computer Graphics and Interactive Techniques 21(4):171-179, Jul. 1987.

Levoy, M., and T. Whitted, "The Use of Points as a Display Primitive," Technical Report TR 85-022, University of North Carolina at Chapel Hill, Department of Computer Science, Jan. 1985.

Lichtenbelt, B., et al., "Introduction to Volume Rendering," © 1998 Hewlett-Packard Company, Prentice-Hall, Upper Saddle River, New Jersey, 1998, pp. 69-74.

Nielson, G.M., et al., "Approximating Normals for Marching Cubes Applied to Locally Supported Isosurfaces," IEEE Visualization, Oct. 27-Nov. 1, 2002, pp. 459-466.

Pfister, H., et al., "Surfels: Surface Elements Rendering Primitives," SIGGRAPH Conference Proceedings, New Orleans, Louisiana, Jul. 23-28, 2000, pp. 335-342.

Soucy, M., and D. Laurendeau, "A General Surface Approach to the Integration of a Set of Range Views," IEEE Transactions on Pattern Analysis and Machine Intelligence 17(4):344-358, Apr. 1995.

Turk, G., and M. Levoy, "Zippered Polygon Meshes From Range Images," SIGGRAPH Conference Proceedings, Orlando, Florida, Jul. 24-29, 1994, pp. 311-318.

* cited by examiner

METHOD AND APPARATUS FOR TRANSFORMING POINT CLOUD DATA TO VOLUMETRIC DATA

CROSS-REFERENCE TO RELATED APPLICATION

This application is a continuation of U.S. patent application Ser. No. 10/309,411, titled METHOD AND APPARATUS FOR TRANSFORMING POINT CLOUD DATA TO VOLUMETRIC DATA, filed Dec. 2, 2002, priority from the filing date of which is hereby claimed under 35 U.S.C. § 120, and which is incorporated in its entirety herein by reference.

FIELD OF THE INVENTION

The present invention relates to the conversion of point cloud data to volumetric data and more particularly to mapping cloud points to voxels.

BACKGROUND OF THE INVENTION

Three-dimensional ("3D") digital data may be produced by a variety of devices that involve three-dimensional scanning or sampling and/or numerical modeling. For example, computed tomography (CT) and magnetic resonance (MR) devices scan portions of the human body and generate image slices of the body, which when combined or stacked, generate a 3D representation of the body, including its surface and internal volume. Laser scanners also generate 3D digital data. A long range laser scanner is fixed in one location and rotated to scan objects around it. Alternatively, a short range laser scanner is mounted on a device that moves around an object while scanning it. In either case, the location of each point scanned is represented as a polar coordinate since the angle between the scanner and the object and distance from the scanner to the object are known. The polar coordinates are then converted to 3D Cartesian coordinates and stored along with a corresponding intensity or color value for the data point collected by the scanner.

As described above, a 3D scanning/sampling/modeling device may generate 3D digital data by collecting a complete set of (x, y, z) locations that represent the shape of an object. Once collected, these point sets are sent to an image rendering system, which then processes the point data to generate a 3D image of the object. The term "point cloud" is used to describe point sets with a high magnitude of points. The data points are unorganized and spaced irregularly within the cloud. Although point cloud data can directly be used to generate 3D images, obtaining desired results from point cloud data is algorithmically non-trivial due to the lack of connectivity information between the points and computationally intensive due, in part, to the high magnitude of unorganized points being processed.

Alternatively, surface point cloud data can be transformed to polygons and the resultant 3D image of the surface of the corresponding object is generated from a mesh of polygons. While point cloud data may be transformed into polygon data, polygon-style rendering engines are still computationally intensive due to the large magnitude of polygons and cannot easily represent the internal volume of solid objects.

Volume graphics represent the most promising way to achieve the degree of realism required for high quality simulations and visualization applications because volume models can contain all the surface and internal characteristics of a real object. In the case of volume graphics, volume elements (i.e., "voxels") are the base data used to represent 3D objects, rather than cloud points or polygons. Voxels are simply pixels that have a third coordinate z in addition to x and y coordinates in a Cartesian coordinate system. In other words, voxels are equally sized cubes that comprise a discretely defined 3D space. However, most archived 3D digital data is in point cloud format or polygon format. In addition, most 3D scanning/sampling/modeling devices generate point cloud or polygon data. Accordingly, there is a need for a method and apparatus, which converts point cloud data to volumetric data. More specifically, the method and apparatus should transform the unorganized, irregular data points of the point cloud into an organized regular three-dimensional array of voxels. Since point cloud data consists of floating point numbers (i.e., due to the fact points are not evenly spaced from one another in the cloud), the method and apparatus should transform the floating point numbers into integer based volume data. Further, the method and apparatus should also transfer any attribute data such as intensity or color from the cloud points to the corresponding voxel.

SUMMARY OF THE INVENTION

A method is provided for transforming a point cloud into a voxel set. The point cloud contains a plurality of points and each point is associated with a set of attributes such as intensity or color, normals, density and/or layer data. Each point in the point cloud and its associated set of attributes is mapped to a voxel in the voxel set. If multiple points in the point cloud map to the same voxel in the voxel set, the sets of attributes associated with the multiple points are combined into a single set of attributes for the voxel to which the multiple points have been mapped. The attributes of these sets may be combined based on a predetermined function such as an averaging function. On the other hand, if only one point in the point cloud is mapped to a voxel, the set of attributes for the voxel is set to the set of attributes for the point being mapped.

In accordance with yet other aspects of the present invention, the point cloud is located in a first coordinate system and the voxel set is located in a second coordinate system. Accordingly, mapping each point in the point cloud to a voxel in the voxel set requires mapping position coordinates for each point from the first coordinate system to position coordinates for the voxel in the second coordinate system. In one embodiment of the present invention, the first coordinate system is a floating point-based coordinate system, while the second coordinate system is an integer-based coordinate system. Accordingly, it may be necessary to scale the position coordinates for each point in the floating point-based coordinate system to the position coordinates of the voxel in the integer-based coordinate system. In yet another embodiment of the present invention, attributes may be scaled when mapped to a voxel as well. For example, the intensity attribute for each point of point cloud data may be scaled when mapped to a corresponding voxel.

In accordance with yet other aspects of the present invention, if the set of attributes associated with the points of the point cloud does not contain a predetermined attribute, such as normal values or layer data, the predetermined attribute may be generated for each voxel of the voxel set.

Finally, in accordance with yet other aspects of the present invention, an apparatus and a computer-readable medium storing computer-executable components are provided that perform in generally the same manner as described above.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PRESENT INVENTION

Figures 1A, 1B:
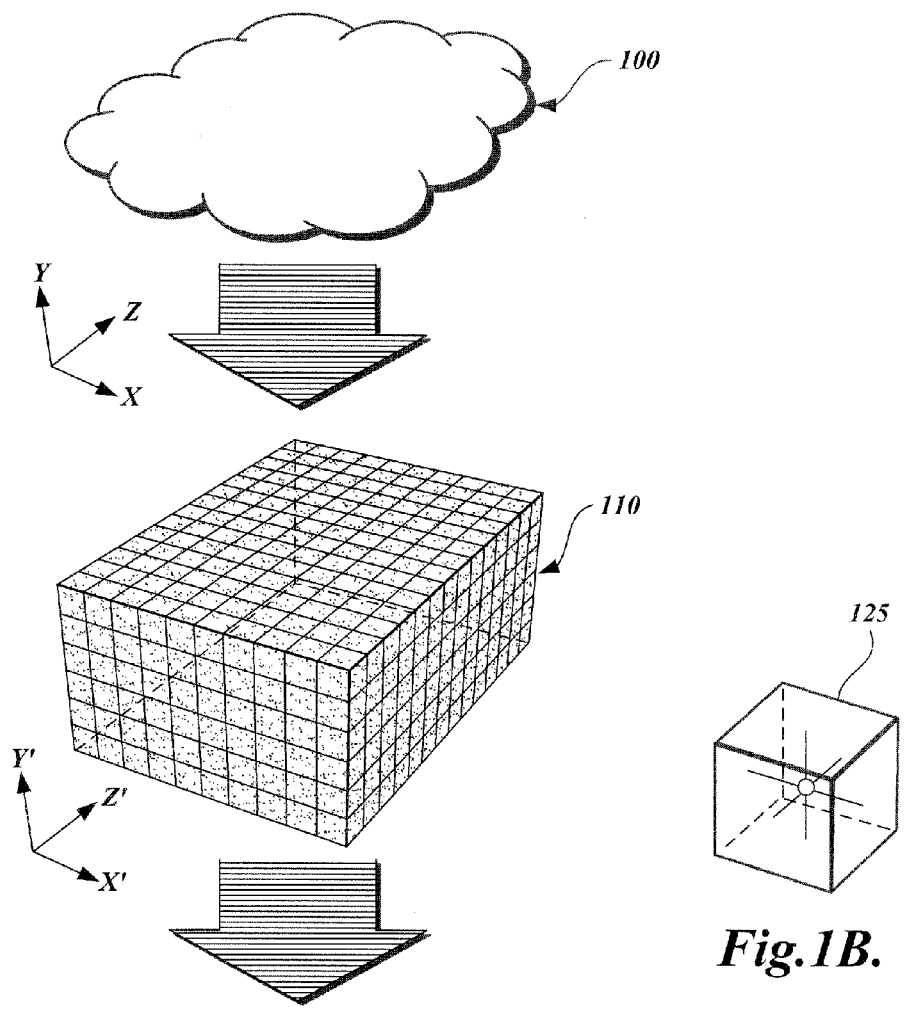
FIGS. 1A and 1B are pictorial diagrams illustrating the transformation of an irregular, unorganized cloud of data points into an organized, regular volumetric data set.

FIGS. 1A and B illustrate the transformation of an irregular, unorganized cloud of data points 100 into a regular, organized volumetric data or "voxel" set 120. Point cloud 100 is a point set with a high magnitude of data points which may be represented in a 3D floating point, cartesian coordinate system having an x-axis, a y-axis and a z-axis. Voxel set 120 is a three-dimensional array of voxels represented in an alternate 3D integer, cartesian coordinate system having an x'-axis, a y'-axis, and a z'-axis. A voxel set may be a cube with equal x', y', and z' dimensions or it may be a box with unequal x', y', and z' dimensions. In accordance with the present invention, each point P(x, y, z) in the point cloud 100 and its associated set of attributes, such as intensity or color, normals, density and/or layer data, are mapped to a voxel V(x', y', z') in the voxel set 120. Given that the point cloud has a high magnitude of points, multiple points from the point cloud may be mapped to a single voxel. The mapping of multiple cloud points to voxels is graphically represented in FIG. 1A as voxel set 110. However, when two or more points are mapped to the same voxel, the disparate attribute sets of the mapped points are combined by the present invention so that each voxel in the voxel set is associated with only one set of attributes. This reduces the complexity of the resulting volumetric data. Hence, the transformation process can also be used for "complexity decimation." Complexity decimation is intended to reduce the complexity of the geometry to high-enough quality for the user's visualization needs, while trying to maintain as much as possible the overall shape of the object being rendered.

The resulting volumetric data is graphically depicted in FIG. 1A as voxel set 120. Voxel set 120 is the same as voxel set 110 except that for those voxels to which a plurality of points have been mapped, the attributes, e.g., intensity or color, density, etc. of the plurality of points are combined. More specifically, after the transformation process is completed (as described in more detail below), a resultant voxel mapped to an x', y', z' coordinate will be associated with a single, less complex, set of attributes. A sample of such a voxel is graphically represented in FIG. 1B as a voxel 125 containing a single point as opposed to multiple points. Those skilled in the art will appreciate that once transformation is complete, some locations in the voxel set 120 will not contain a voxel 125 because no data points in the point cloud 100 were mapped to that location. In addition, those skilled in the art will recognize that once transformation is complete, some voxels 125 may only correspond to one data point in the point cloud 100.

Figure 2:
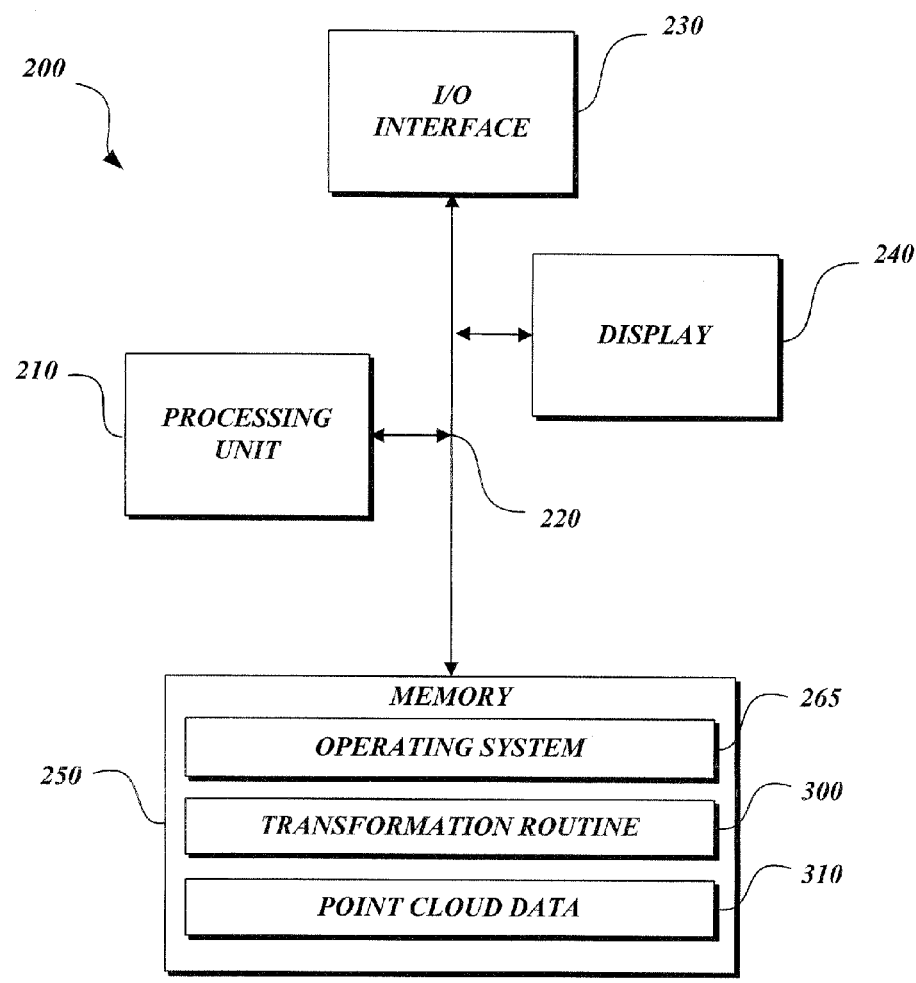
FIG. 2 is a block diagram of several components of a computing device that are used to transform the point cloud data to volumetric data.

FIG. 2 depicts several of the key components of a computing device 200 that may be used to transform point cloud data to volumetric data. Those skilled in the art will appreciate that the computing device 200 may include many more components than those shown in FIG. 2. However, it is not necessary that all of these generally conventional components be shown in order to disclose an enabling embodiment for practicing the invention. As shown in FIG. 2, the computing device 200 includes an input/output ("I/O") interface 230 for connecting to other 3D data collection devices, such as laser scanners (not shown). Those skilled in the art will appreciate that the I/O interface 230 includes the necessary circuitry for such a connection, and is also constructed for use with the necessary protocols.

The computing device 200 also includes a processing unit 210, a display 240, and a memory 250 all interconnected along with the I/O interface 230 via a bus 220. The memory 250 generally comprises a random access memory ("RAM"), a read-only memory ("ROM"), and a permanent mass storage device, such as a disk drive, tape drive, optical drive, floppy disk drive, or combination thereof. The memory 250 stores an operating system 265, a routine 300 for transforming point cloud data to volumetric data and a database 310 for storing the raw point cloud data that will be transformed by the present invention into volumetric data. In other embodiments of the present invention, memory 250 may also store programs and routines appropriate for rendering 3D images based on the volumetric data generated by the transformation routine 300. In one embodiment of the present invention, the rendering routines and techniques disclosed in commonly owned Patent Cooperation Treaty Application Serial No. PCT/CA01/01010 (Publication No. WO 02/07088A2) entitled "LIGHTING ADJUSTMENT METHODS AND APPARATUS FOR VOXEL DATA," and commonly owned Patent Cooperation Treaty Application Serial No. PCT/CA01/00997 (Publication No. WO 02/07089A2) entitled "APPARATUS AND METHOD FOR ASSOCIATING VOXEL INFORMATION WITH DISPLAY POSITIONS," are stored in memory 250 and used to render 3D images based on the volumetric data generated by the transformation routine 300. Both of said applications are specifically incorporated herein by reference. It will be appreciated that the software components described above may be loaded from a computer-readable medium into memory 250 of the computing device 200 using a drive mechanism (not shown) associated with the computer readable medium, such as a floppy, tape or DVD/CD-ROM drive, or via the I/O interface 230.

Although an exemplary computing device 200 has been described that generally conforms to a conventional general purpose computing device, those skilled in the art will appreciate that a computing device 200 may be of any of a great number of devices capable of transforming point cloud data to volumetric data. However, in at least one embodiment of the present invention, the computing device 200 does not require specialized hardware. Rather a standard processor as used in a typical laptop, desktop computer or PDA, is sufficient. Further, a constrained memory, i.e., a limited amount of memory relative to a typical computer graphics rendering system, is sufficient. Neither specialized hardware nor a significantly large amount of memory is necessary because the volumetric data, e.g., voxel set 120, is stored in memory in a data structure that facilitates fast retrieval, storage, deletion and rendering of voxels. Such a data structure is described in commonly owned Patent Cooperation Treaty Application Serial No. PCT/CA01/00686 (Publication No. WO 02/07097A1) entitled "METHOD, APPARATUS, SIGNALS AND CODES FOR ESTABLISHING AND USING DATA STRUCTURE FOR STORING VOXEL INFORMATION," which is specifically incorporated herein by reference. Accordingly, in one embodiment of the present invention, the computing device 200 requires only 512 megabytes of RAM and a 700 megahertz Intel® Pentium®III processor or an equivalent thereof.

Figure 3:
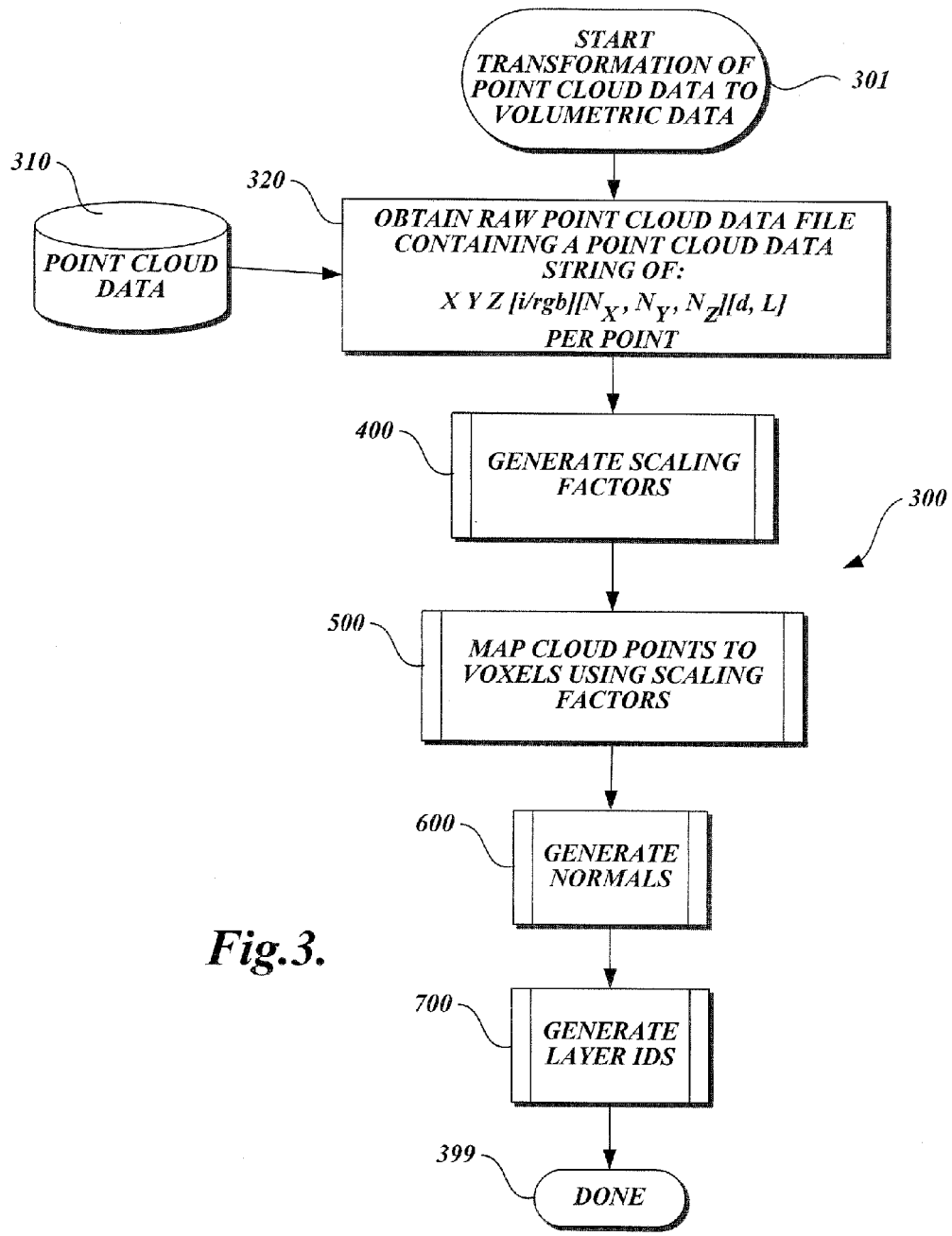
FIG. 3 is a flow diagram illustrating a routine for transforming point cloud data into volumetric data.

FIG. 3 is a flow diagram illustrating the transformation routine 300, which transforms point cloud data to volumetric data in accordance with the present invention. Routine 300 begins in a block 301 and proceeds to a block 320 where a raw point cloud data file is retrieved from the point cloud database 310 stored in memory 250 of the computing device 200. As noted above, the raw point cloud data may have been obtained from a variety of 3D digital systems, such as an MRI/CT device, a laser scanner or a CAD system, and loaded into memory 250 using a drive mechanism or via the I/O interface 230. The point cloud data file contains a high magnitude of data points, each data point associated with a number of attributes, typically intensity or color, normals, density, and/or layer ID. Each data point P(x, y, z) in the point cloud and its associated attributes are typically represented by the following data string:

x,y,z[ilrgb][$N_x$,$N_y$,$N_z$][d,L]

x, y, z=3D coordinate position of point P(x, y, z)

i=intensity at point P(x, y, z)

rgb=color at point P(x, y, z) (a point cloud data file will typically have associated with it either intensity values for each point or color values for each point, but typically not both)

$N_x$, $N_y$, $N_z$=normals at point P(x, y, z) with respect to the x-axis, y-axis and z-axis, respectively (an assumption is made that the normals are normalized from the input (i.e., the magnitude of the normal is 1); if not, (Nx, Ny, Nz) needs to be normalized before applying the methods below)

d=density at point P(x, y, z)

L=layer ID at point P(x, y, z)

Once the point cloud data file is obtained, routine 300 scans the point cloud data for a first time in order to generate scaling factors for position and intensity in order to produce matching position and intensity ratios in the corresponding voxel set. The scaling factors are generated in a subroutine 400, which will be described in more detail below. Once the scaling factors for position and intensity are generated in a block 400, routine 300 proceeds to a subroutine 500 which passes through the point cloud data file a second time in order to map the point cloud data points to voxels in the voxel set using the scaling factors generated in subroutine 400. As will be described in more detail below, as the data points are mapped to corresponding voxels, and it is determined that more than one data point has been mapped to a particular voxel, the attributes associated with each subsequently mapped data point are combined with the attributes of prior mapped data points in accordance with a predetermined function so that the corresponding voxel only contains a single set of attributes.

Once all of the data points have been mapped to voxels in a corresponding voxel set, the transformation routine 300 proceeds to a subroutine 600 to generate normals for each voxel with respect to the x'-axis, y'-axis and z'-axis. A normal is a unit vector, represented by a floating point triplet, that is perpendicular to a surface at a designated point. Normals are used during image rendering to apply the appropriate lighting to the object being rendered. However, those skilled in the art will recognize that subroutine 600 is optional and need only be performed if desired by the user and/or if normals were not present in the original point cloud data, and thus not mapped to a corresponding voxel. Although normals will be generated by subroutine 600 for voxels belonging to solid regions of the object being rendered, those skilled in the art will appreciate that the normals generated by subroutine 600 will be most accurate for those voxels belonging to the object's surface regions.

Finally, once normals have been generated for each voxel in the voxel set in subroutine 600 (or if normals optionally were not generated), transformation routine 300 proceeds to a subroutine 700 which generates a layer ID for each voxel. In volumetric computer graphics, layers are groupings of logically related voxels in the rendered object, such as a part or component of the object. Accordingly, a layer ID identifies the layer of the rendered object to which the voxel belongs. Once layer IDs have been generated (or if optionally not generated), the transformation routine 300 then ends in a block 399.

Figure 4A:
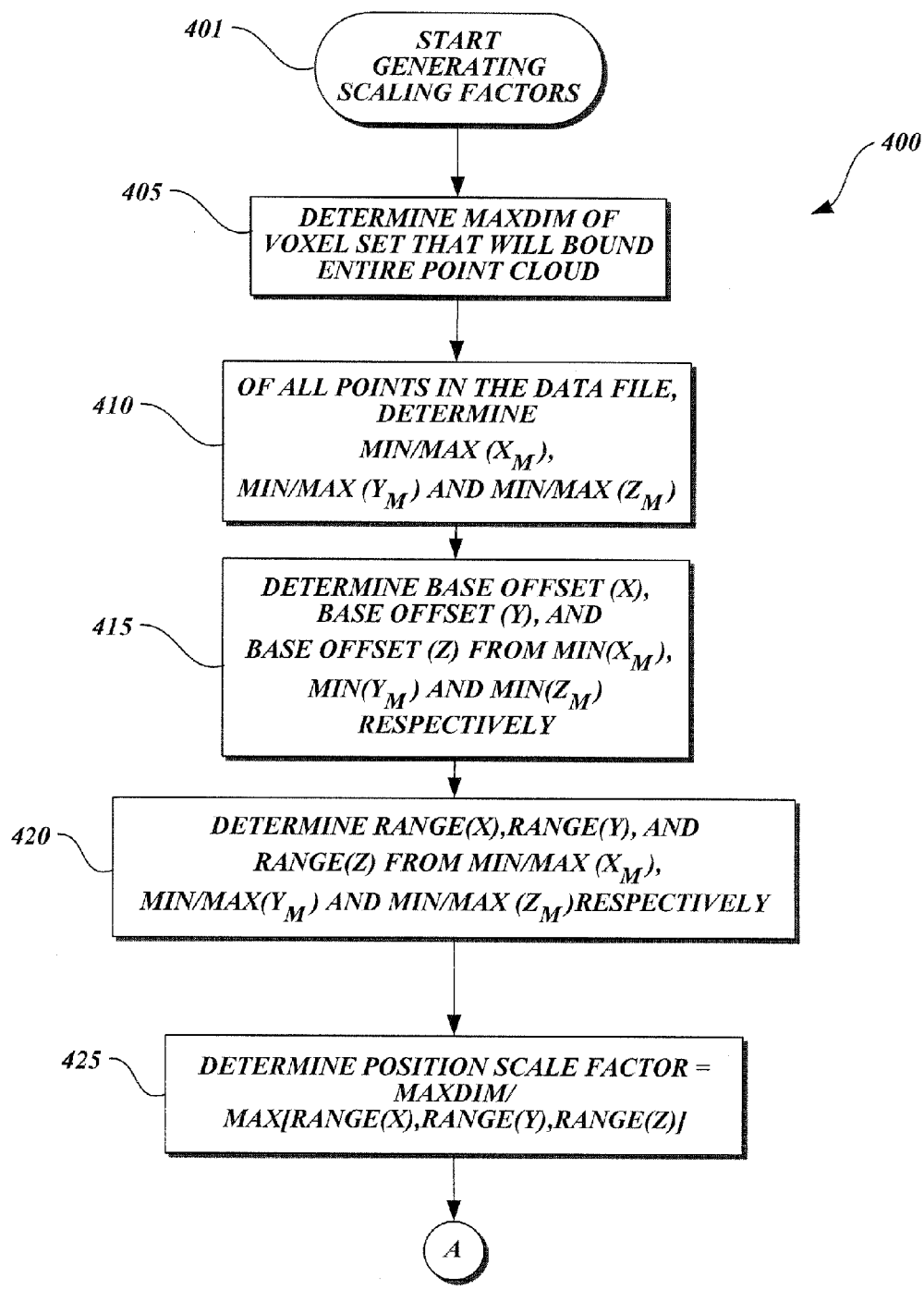
FIGS. 4A-4B are flow diagrams illustrating a preprocessing subroutine for generating scaling factors for the location and intensity attributes associated with the point cloud data.

Now that a general overview of the transformation routine 300 has been provided, each of the subroutines of the transformation routine will be described in more detail. As noted above, once the point cloud data file is obtained, routine 300 scans the point cloud data for a first time in order to generate scaling factors for position and intensity in order to produce matching position and intensity ratios in the corresponding voxel set. The subroutine 400 for generating such scaling factors is shown in more detail in FIGS. 4A and 4B. The scaling routine 400 begins in a block 401 and proceeds to a block 405 where it determines the maximum dimension of the voxel set that bounds the entire point cloud to be mapped. The maximum dimension is defined as the (integer) voxel resolution for the dominant axis, where the dominant axis is one of the x, y, z axes whose bound is the largest. For example, if the size of the point cloud were bounded by 30.5×20.5×15.5 units in the x, y, z axes, then the dominant axis is the x-axis and a maximum dimension of 610 indicates that the voxel resolution in the x', y', z' coordinate system will be 610×410×310.

As will be described in more detail below, the maximum dimension is used to generate a position scaling factor for any data points mapped to a voxel. Those skilled in the art will appreciate that the position of the data point may need to be scaled when mapping the data point to a voxel because points P(x, y, z) in 3D floating point coordinates are mapped to voxels V(x', y', z') in 3D integer coordinates, in the range of [0, voxel resolution –1]. In one embodiment of the present invention, a user inputs the maximum dimension of the voxel set that will bound the entire point cloud. Alternatively, the user may input that no scaling is to be performed, in which case the maximum dimension is the same as the dominant axis bounds of the point cloud. In the example above where the point cloud is bounded by 30.5×20.5×15.5 units in the x, y, z axes, no scaling means that the voxel resolution in x', y', z' would be 31×21×16 (rounded off to the nearest integer). In yet another embodiment of the present invention, the maximum dimension of the voxel set that will bound the entire point cloud is set to a default value. Regardless of how the maximum dimension is determined, in one embodiment of the present invention a lower bound for the maximum dimension is set at $512^3$ and an upper bound is set at $1024^3$ in order to provide reasonable resolution on the display 240 of the computing device 200. However, the upper and lower bound for the maximum dimension could be set to greater or lower values as deemed appropriate by the user or developer without departing from the spirit and scope of the present invention. For example the upper and lower bounds may be decreased for PDA applications. In yet other embodiments, the maximum dimension may have a value corresponding to 0.5-2.0 times the resolution of the intended display in order to achieve complexity decimation but maintain high enough quality for visualization. Complexity decimation is achieved as voxel resolution decreases because fewer voxels need to be generated, stored, rendered, etc. Accordingly, voxel resolution can be set at a good enough level to achieve acceptable quality for visualization based on the resolution of the display device upon which the volumetric data will be rendered.

Once the maximum dimension of the voxel set that will bound the entire point cloud is determined in block 405, scaling subroutine 400 continues to a block 410 where the minimum and maximum of the x, y, and z coordinates of all points P(x, y, z) in the data file are determined. If the data cloud includes M number of data points, scaling subroutine 400 determines the minimum($x_M$) and maximum($x_M$), the minimum($y_M$) and maximum($y_M$), and the minimum($z_M$) and maximum ($z_M$).

Next in a block 415, the scaling subroutine 400 determines a base offset for the x coordinates, the y coordinates, and the z coordinates. More specifically, the base offset(x) is set to minimum($x_M$), which is essentially the distance between the origin and the minimum($x_M$) coordinate of the point cloud set. Similarly, base offset(y) is set to minimum($y_M$), and base offset(z) is set to minimum($z_M$).

Once the base offsets for each axis have been determined, ranges for the x coordinates, y coordinates, and z coordinates are determined in a block 420. More specifically, range(x) is determined as the difference between minimum($x_M$) and maximum($x_M$), range(y) is determined as the difference between minimum($y_M$) and maximum($y_M$), and range(z) is determined as the difference between minimum($z_M$) and maximum($z_M$).

The position scale factor is then ultimately determined in a block 425 by dividing the maximum dimension by the maximum of the range(x), range(y) and range(z). As will be described in more detail below, the position scale factor is used when mapping individual data points to voxels to ensure that the position of the mapped voxel is scaled appropriately to the dimensions of the voxel set. Those skilled in the art will also appreciate that a variety of predetermined functions deemed suitable or desirable by a developer can be used to determine the position scaling factor. Further, a function can be chosen to produce smaller base offsets and/or larger ranges to accommodate future rendering modifications. Accordingly, the point cloud is not so tightly fit into the voxel set and data may be added to the empty region after point cloud to voxel transformation.

Figure 4B:
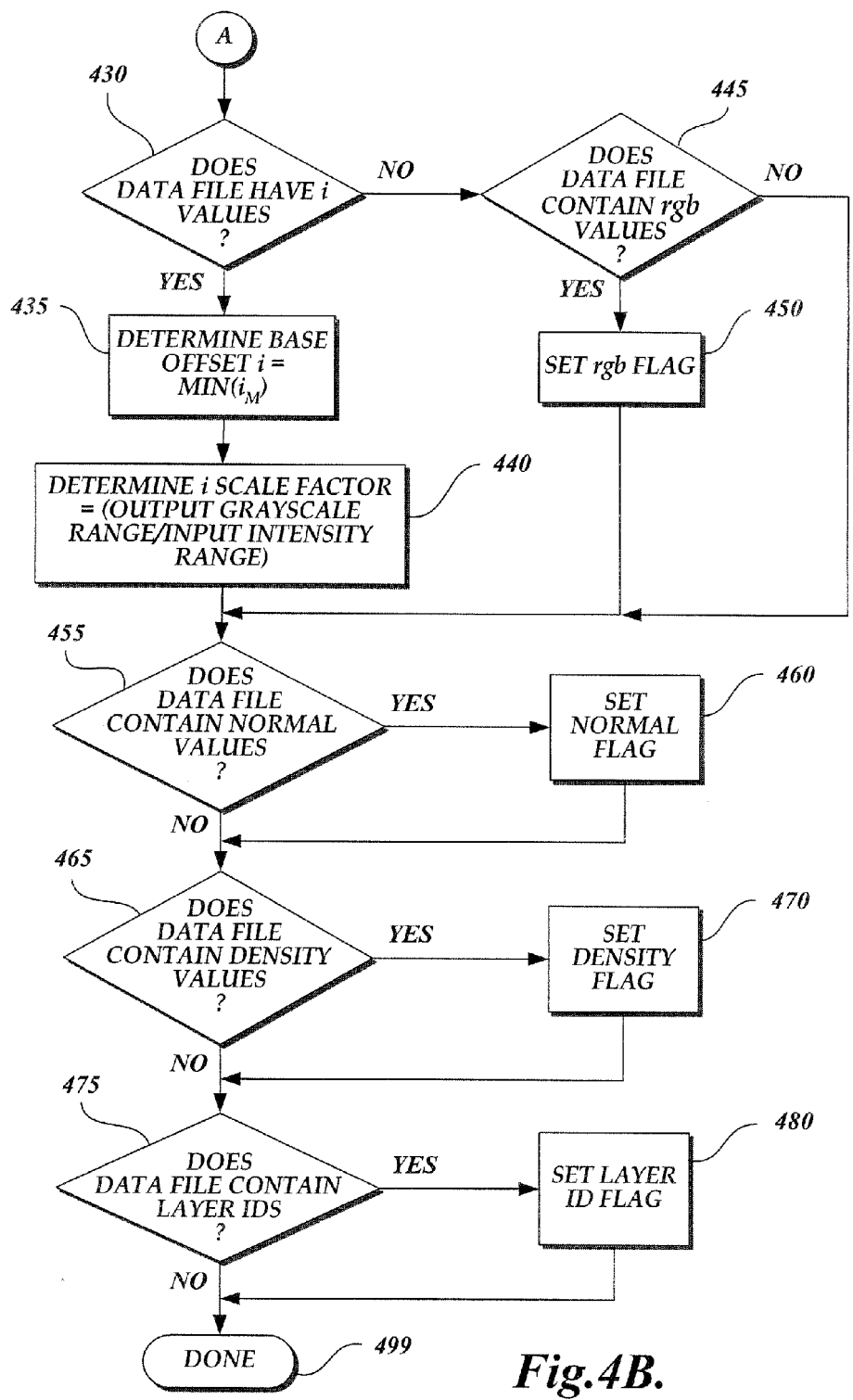

Once the position scale factor has been determined, an intensity scale factor must also be determined if the data file retrieved from the point database 310 contains intensity values. In one embodiment of the present invention, the intensity scale factor acts as a normalization factor to the intensity values. As noted above, point clouds will have typically either intensity values associated with each data point or color, i.e., "rgb," values associated with each data point, but typically not both intensity and rgb values. As those skilled in the art will appreciate, intensity refers to the brightness or darkness of an object at a particular point. Intensity is typically represented as a gray scale, floating point value. Color or rgb (red, green, blue) values, on the other hand, are usually 8-bit character values from which the range of colors that can be displayed by a rendering system are generated. Accordingly, and as shown in FIG. 4B, the scaling subroutine 400 determines in a decision block 430 if the data file contains intensity (i.e., "i") values. If so, the subroutine proceeds to a block 435 where a base offset for intensity (i.e., base offset (i)) is determined in one embodiment of the present invention to be the minimum of all intensity values found in the point cloud (i.e., minimum ($i_M$)). Those skilled in the art will also appreciate that a variety of predetermined functions deemed suitable or desirable by a developer can be used to determine the base offset(i). Further, a function can be chosen to produce a smaller base offset and a larger maximum intensity to accommodate future rendering modifications. Once base offset(i) is determined, the scaling subroutine 400 proceeds to a block 440 where an intensity scaling factor is determined. In one embodiment of the present invention, the intensity scaling factor is set equal to the output gray scale range divided by the input intensity range. The input intensity range may be calculated by (maximum($i_M$)–base offset(i)). The output gray scale range may be calculated as S*($i_M$–base offset (i)), where S is a scaling factor to map values of [0,1] to the desired display output gray scale range. In one embodiment of the present invention, S is a linear normalization scaling factor and is set to 255 because a valid intensity range of [0,255] allows intensity to be mapped to rgb values directly. Those skilled in the art will recognize that rgb values usually reside in the [0,255] range. In other embodiments of the present invention, S is a nonlinear scaling factor, such as a gamma correction.

As will be described in more detail below, the intensity scaling factor will be used when each data point associated with an intensity value is mapped to a voxel so that the intensity value mapped to the voxel is appropriately scaled for appropriate display of intensity values from a voxel set. Those skilled in the art will appreciate that such scaling is necessary in order to ensure proper rendering of intensity in any subsequent image rendering.

Returning to decision block 430, if the data file does not contain intensity values, the logic proceeds to another decision block 445 that determines whether the data file contains rgb values. If so, an rgb flag is set in a block 450. As will be described in more detail below, the rgb flag will be used to transfer the color values associated with a data point to a corresponding mapped voxel.

Once the intensity or color values have been considered, scaling subroutine 400 proceeds to decision block 455 where it determines if the data file contains normal values (i.e., ($N_x$, $N_y$, $N_z$)). If so, a normal flag is set in a block 460. As will be described in more detail below, the normal flag will be used to determine whether or not normal values will be generated for the voxel to which a data point is mapped. If the data file does not contain normal values, or if it does and the normal flag is set, the scaling subroutine 400 proceeds to a decision block 465 where it determines if the data file contains density (i.e., "d") values. As those skilled in the art will appreciate, density in a 3D computer graphics environment is a measurement of how much transmitted light passes through an image at a particular point. Density values are most often used in medical applications such as MRI scans. As opposed to intensity values, density values are positive integer values. If the data file contains density values, a density flag is set in a block 470. As is the case with the normal values and as will be described in more detail below, the density flag is used to determine whether a density value will be generated for the voxel to which a data point is mapped.

If the data file does not contain density values, or if the data file does contain density values and the density flag has been set, the scaling subroutine 400 proceeds to a decision block 475 which determines if the data file contains layer IDs. As noted above, a layer ID identifies the layer of the rendered object to which a data point (or voxel) belongs. Layer IDs are represented as positive integer values. If the data file contains layer IDs the routine proceeds to a block 480 which sets a layer ID flag. As with the normal values and the density value and as will be described in more detail below, the layer ID flag is used to determine whether a layer ID will be generated for the voxel to which a data point is mapped.

After consideration of layer IDs, the first pass of the data file is completed and the scaling subroutine 400 ends in a block 499. Returning to FIG. 3, once the scaling routine 400 has generated the appropriate scaling factors for position and intensity, and set the appropriate flags for color, normals, density and layer IDs, the transformation routine 300 proceeds to a block 500 to begin a second pass of the point cloud data file. As will be described in more detail below, the second pass of the point cloud data file maps cloud points to voxels using the position and intensity scaling factors generated in subroutine 400. The subroutine 500 for mapping cloud points to voxels is shown in more detail in FIGS. 5A-5C.

Figure 5A:
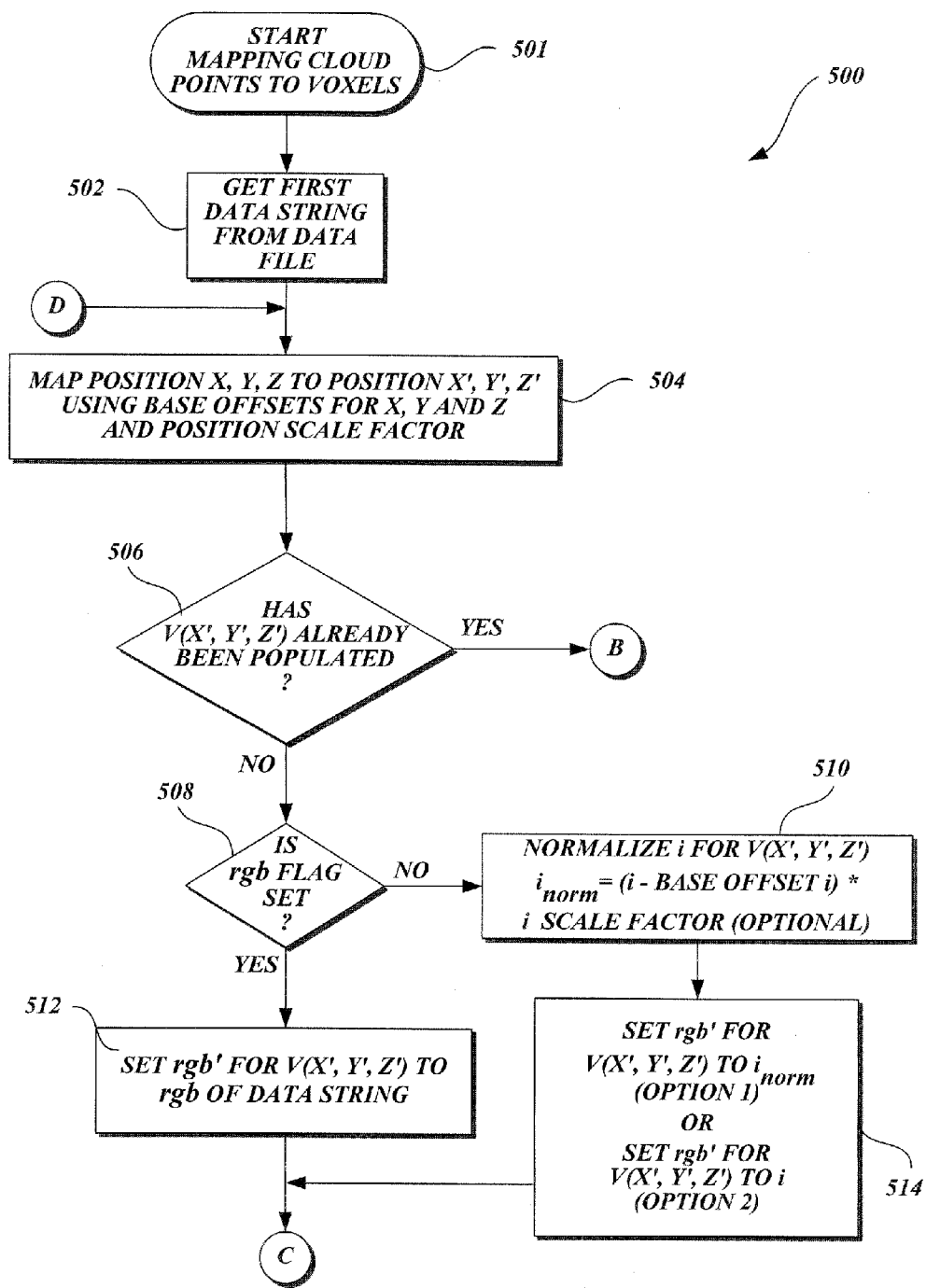
FIGS. 5A-5C are flow diagrams illustrating a subroutine for mapping cloud points to voxels.

The mapping subroutine 500 begins in FIG. 5A in a block 501 and proceeds to a block 502 where the first data string for a point P(x, y, z) is obtained from the point cloud data file. Next, in a block 504 the x, y, z position of point P(x, y, z) in the cartesian coordinate system of the point cloud is mapped to an x', y', z' position for a voxel V(x', y', z') in the alternate coordinate system of the voxel set. The point cloud position data can be a real number plus or minus a predetermined range of precision, i.e., a non-integral value. The range of precision depends on the 3D scanning/sampling/modeling device used to collect the point data in the first place. However, when the x, y, z position data is transformed into x', y', z' position data, it is also transformed into integer values which are more easily stored and more quickly calculated, resulting in yet further complexity decimation. The x, y, z position of P(x, y, z) is mapped to the x', y', z' position of V(x', y', z') using the base offset(x), base offset(y), base offset(z), and the position scale factor determined during the scaling subroutine 400. More specifically, the x' coordinate for voxel V(x', y', z') is calculated by subtracting the base offset(x) from the x coordinate and multiplying the result by the position scale factor. The y' position coordinate for voxel V(x', y', z') is calculated by subtracting the base offset(y) from the y coordinate and multiplying the result by the position scale factor. The z' position coordinate for the voxel V(x', y', z') is calculated by subtracting the base offset(z) from the z coordinate and multiplying the results by the position scale factor. The resulting coordinates are then rounded off to the nearest integer.

Once the x, y, z position of data point P(x, y, z) has been mapped to the x', y', z', position of a corresponding voxel V(x', y', z'), the mapping subroutine 500 determines in a decision block 506 if the voxel located at position x', y', z' has already been populated. In other words, the mapping subroutine 500 determines if one or more data points have already been mapped to voxel V(x', y', z') so that the voxel already contains attribute data such as intensity or color, normals, density and/or layer ID. If not, data point P(x, y, z) is the first point to be mapped to voxel V(x', y', z') and the attributes associated with this voxel must be initialized accordingly. Consequently, the mapping subroutine 500 proceeds to a decision block 508, where it determines if the rgb flag has been set. As noted above, if the rgb flag has been set, the data point being mapped to the voxel contains a color value rather than an intensity value. Accordingly, the mapping subroutine proceeds to a block 512 where the rgb value (i.e., "rgb'") for voxel V(x', y', z') is set to the rgb value contained in the data string for point P(x, y, z).

On the other hand, if the rgb flag is not set, the mapping subroutine 500 will proceed from decision block 508 to a block 510 so that an appropriate intensity value is initialized for the mapped voxel V(x', y', z'). In one embodiment of the present invention, the intensity value for the voxel V(x', y', z') is normalized. More specifically, a normalized intensity value (i.e., "$i_{norm}$") is calculated by subtracting the base offset(i) calculated during the scaling subroutine 400 from the intensity value of the P(x, y, z) data string, and multiplying that result by the intensity scale factor also generated during the scaling routine 400. Those skilled in the art will appreciate that a variety of predetermined functions deemed suitable or desirable by a developer may be used to normalize the intensity value for the mapped voxel, such as gamma correction. Those skilled in the art will also appreciate that normalizing the intensity value is optional. Accordingly, rgb' for the voxel V(x', y', z') would be set in a block 514 to the intensity value found in the data string of the current point P(x, y, z) being mapped. Alternatively, the rgb' for the voxel V(x', y', z') is set to $i_{norm}$. In another embodiment of the invention, the intensity value (whether it be $i_{norm}$ or i) is simply copied to the voxel's intensity attribute, instead of mapping it to the voxel's color attribute (as above).

Figure 5B:
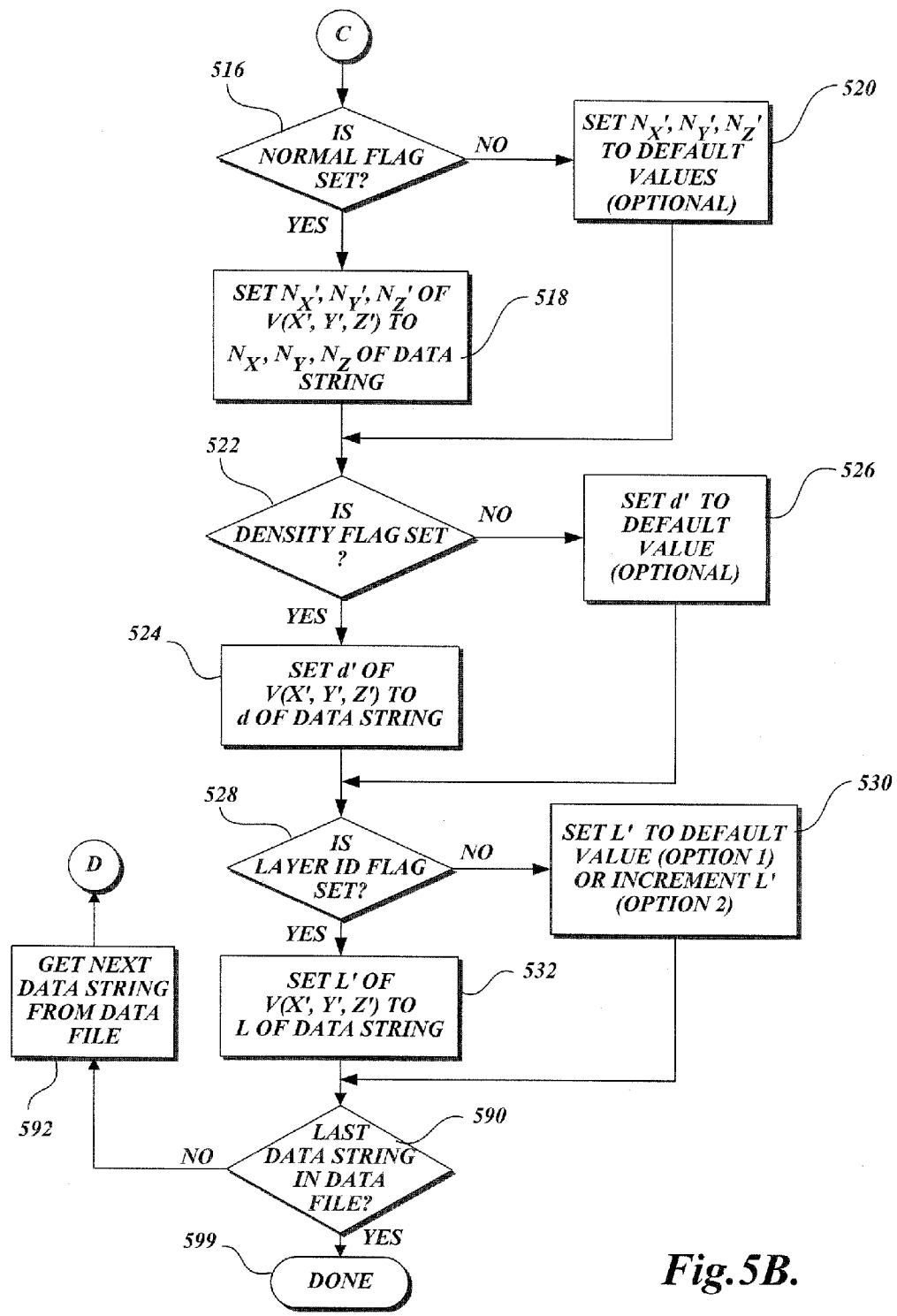

Once the rgb or intensity value for voxel V(x', y', z') has been set, the mapping subroutine 500 proceeds to a decision block 516 in FIG. 5B which determines if the normal flag has been set during the first pass of the point cloud data file, i.e., during the scaling subroutine 400. If so, the normal values for the x'-axis, y'-axis, and z'-axis (i.e., ($N_x'$, $N_y'$, $N_z'$)) of mapped voxel V(x', y', z') are set in a block 518 to the corresponding x-axis, y-axis and z-axis normals found in the P(x, y, z) data string. However, it is possible that point P(x, y, z) does not have any normal attributes. Accordingly, the normal flag would not have been set during the scaling subroutine 400 and the result of decision block 516 would be negative. If negative, $N_x'$, $N_y'$ and $N_z'$ could optionally be set to a default value in block 520. If not set to a default, the voxel normals could also be generated separately, e.g., in subroutine 600.

Once normal attributes for the mapped voxel V(x', y', z') have been considered, the mapping subroutine 500 proceeds to another decision block 522 in which it determines if the density flag has been set by the scaling subroutine 400. If so, the density value (i.e., "d'") of voxel V(x', y', z') is set in a block 524 found in the data string of point P(x, y, z). Otherwise, d' is set to a default value in a block 526. As is the case with the normal values of the mapped voxel, setting the density value of voxel V(x', y', z') to a default is also optional.

Once density attributes for the mapped voxel V(x', y', z') have been considered, the mapping subroutine 500 proceeds to a decision block 528 where it determines if the layer ID flag has been set for point P(x, y, z) during the scaling subroutine 400. If so, the layer ID (i.e., "L'") of voxel V(x, y, z) is set to the layer ID (i.e., "L") of the P(x, y, z) data string in a block 532. If the layer ID flag has not been set, the mapping subroutine 500 proceeds to a block 530. In one embodiment of the present invention, L' is set to a default value much like d'.

Once layer attributes have been considered, processing of the data string for point P(x, y, z) is concluded and the mapping subroutine 500 proceeds to a decision block 590 in which it determines whether the last data string in the file has been processed. If so, the second scan of the data file has been completed and mapping of all of the data points in the point cloud to a voxel in the voxel set has also been completed. Accordingly, the mapping subroutine ends in a block 599.

However, if the last data string in the data file has not been processed, the mapping subroutine 500 proceeds to a block 592 in which the next data string is obtained from the data file so that the next data point can be mapped to a voxel. The mapping subroutine 500 then returns to block 504 of FIG. 5A so that the next data point can be mapped to a voxel. If the next data point is mapped to a voxel that has already been populated, then the result of the next decision block 506 is positive and mapping subroutine 500 proceeds to a decision block 534 in FIG. 5C.

If more than one data point is mapped to the same voxel, then the attributes associated with each subsequent data point must be combined with the attributes of the prior data points mapped to the voxel because each voxel can contain only one piece of color data/intensity data, normal data and of layer data. Accordingly, the mapping subroutine 500 resets the rgb, density and layer ID values of the mapped voxels as appropriate to meet these requirements. More specifically, the mapping subroutine 500 proceeds to a block 536 in FIG. 5C which resets rgb' for voxel V(x', y', z') based on a predetermined function. In one embodiment of the present invention, rgb' is determined as an average of the rgb values associated with all the prior data points mapped to the same voxel. However, those skilled in the art will recognize that a variety of functions deemed suitable or desirable by a developer may be used to combine the rgb values of all the data points mapped to the same voxel. For example, a Gaussian function favoring points closer to the center of the voxel could be used. In yet other embodiments of the present invention, rgb' for voxel V(x', y', z') can simply be overridden, i.e., set to a default value or set to the color value of the current point P(x, y, z) being mapped. Although not ideal, overriding rgb' may achieve rendering results that are good enough for the purposes of the ultimate viewer.

Returning to decision block 534, if the rgb flag has not been set, then the mapping subroutine proceeds to a block 535 so that i' for voxel V(x', y', z') can be reset based on a predetermined function so as to combine the intensity values of all the data points mapped to the same voxel. As with color, in one embodiment of the present invention, i' is calculated by averaging the intensity values of all of the data points that have been mapped to the same voxel. However, those skilled in the art will appreciate that a wide variety of functions deemed suitable or desirable by a developer may be used to combine the intensity values of the multiple data points mapped to the same voxel. Those skilled in the art will also appreciate that in other embodiments of the present invention, the intensity value for the mapped voxel can simply be overridden, i.e., set to a default value or set to the intensity value of the point P(x, y, z) currently being mapped. Again, overriding the intensity value may not be ideal, but it may achieve rendering results that are good enough for the purposes of the ultimate viewer. Once i' for the voxel has been reset, rgb' is set to i' in box 535 as well so that subsequent rendering programs will read the intensity value as a color value and render the value accordingly.

Once color or intensity values have been considered, the mapping subroutine 500 proceeds to a decision block 538 in which it determines if the density flag has been set. If so, d' of the mapped voxel V(x', y', z') is reset based on a predetermined function so as to combine the density values of the multiple data points mapped to the voxel. As with the intensity or color values, in one embodiment of the present invention, d' is determined as an average of the density values of all the data points that have been mapped to the same voxel. And as also is the case with the intensity and color values, a variety of functions deemed suitable or desirable by a developer may be used to combine the density values of the multiple data points mapped to the voxel V(x', y', z'). Such predetermined functions may also include simply setting overriding the density value, i.e., setting d' to a default value or to the density of the point P(x, y, z) currently being mapped.

Once the density values have been considered, mapping subroutine 500 proceeds to a decision block 542 in which it determines if the layer ID flag has been set. If so, L' for voxel V(x', y', z') is reset in a manner similar to that described above in connection with the density values and the color/intensity values, e.g., to an average, to a default, to L of the current point P(x, y, z), or in accordance with some other predetermined function.

Figure 5C:
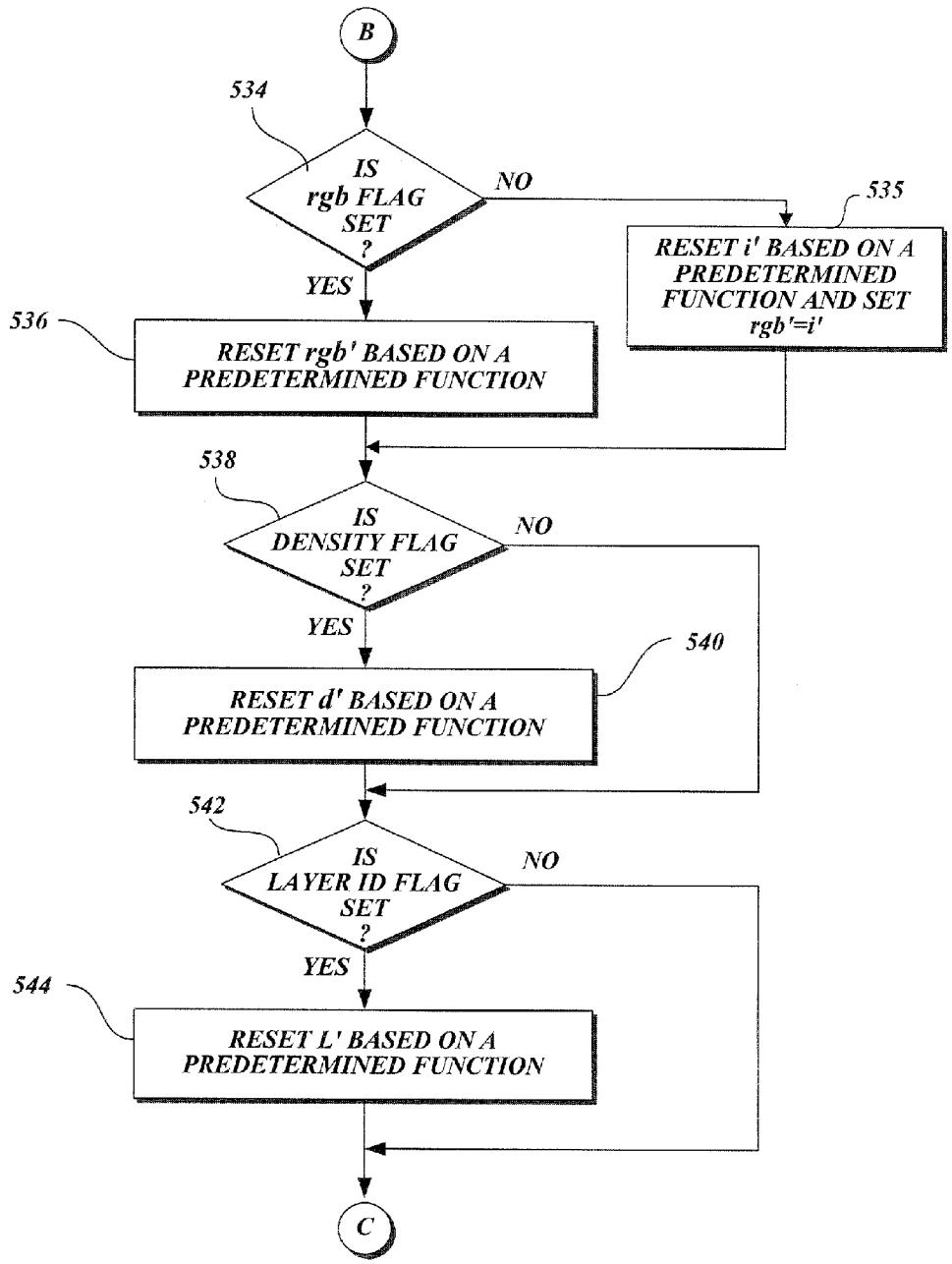

The result of blocks 534-544 depicted in FIG. 5C is to combine the attributes of multiple data points mapped to the same voxel into a single attribute set. Once that has been completed, the mapping subroutine returns to decision block 590 in FIG. 5B to determine if the last data string associated with a data point in the point cloud data file has been processed. If not, the next data string for the next data point is retrieved from the data file and mapped to a voxel as described above. Once the last data string has been processed, the mapping subroutine 500 ends in a block 599.

Figure 6:
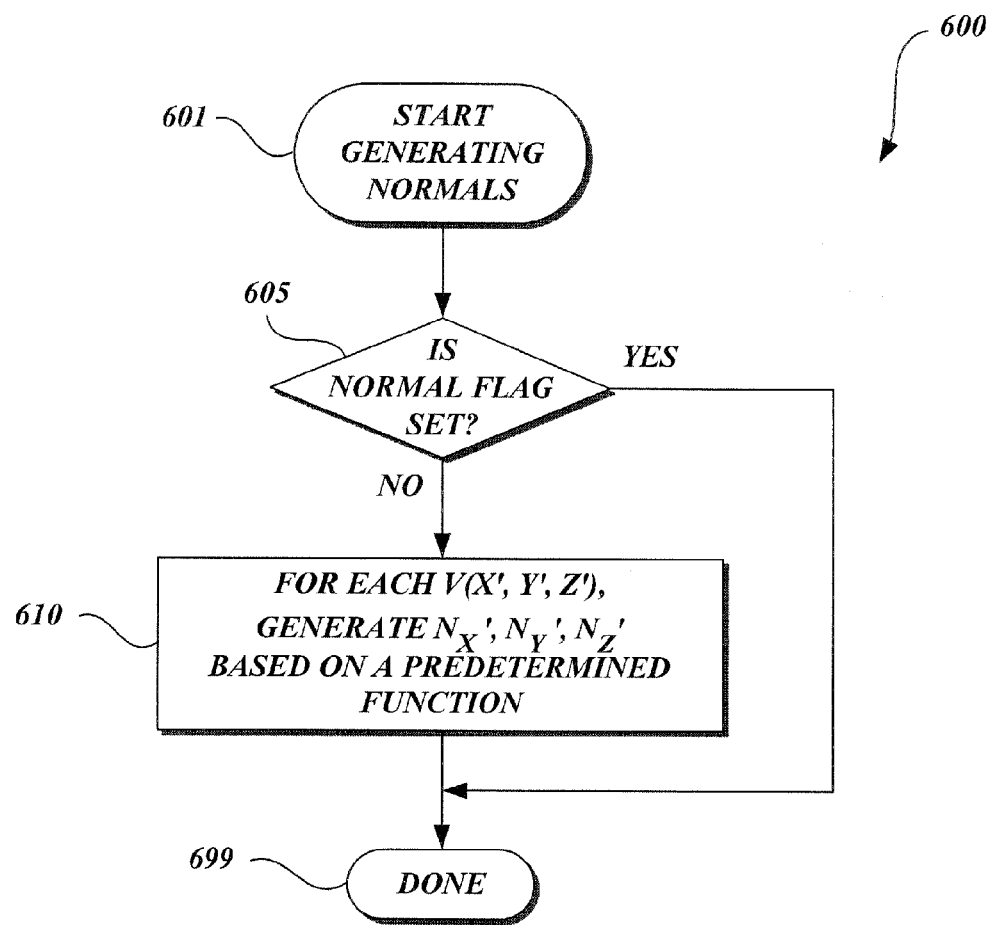
FIG. 6 is a flow diagram illustrating a subroutine for generating normals for each mapped voxel.

Once all of the cloud points in the point cloud data file have been mapped to voxels, a voxel set 120 as shown in FIG. 1A is generated. Each voxel 125 in voxel set 120 thus contains a single set of attributes, regardless of how many data points from the point cloud have been mapped to it (provided that at least one data point has been mapped to it). Returning to FIG. 3, when mapping subroutine 500 ends and the voxel set 120 has been created, the transformation routine 300 proceeds to a subroutine 600 in which normals may be generated for the voxels in the voxel set 120 if they have not been generated already. The normal generation routine 600 is shown in more detail in FIG. 6. Subroutine 600 begins in a block 601 and proceeds to a decision block 605 in which it determines if the normal flag has previously been set. If yes, then normals have already been generated for each of the voxels in the voxel set 120 and the subroutine 600 ends in a block 699. However, if the normal flag has not been set, then either the point cloud data originally mapped to the voxels did not contain normal values or the normal values for the mapped voxels were simply set to a default value during the mapping routine 500. Accordingly, in a block 610, normal values ($N_x'$, $N_y'$, $N_z'$) are generated for each voxel V(x', y', z') in the voxel set based on a predetermined function or algorithm. In one embodiment of the present invention, the algorithm used to generate these values is described in the commonly-owned U.S. Pat. No. 6,867,774 B1, issued Mar. 15, 2005, and entitled "METHOD AND APPARATUS FOR TRANSFORMING POLYGON DATA TO VOXEL DATA FOR GENERAL PURPOSE APPLICATIONS." However, those skilled in the art will appreciate that any predetermined function or algorithm deemed suitable by a developer may be used to generate normals for each of the voxels of the voxel set. Further, those skilled in the art will also appreciate that generating normals for each of the voxels is optional and thus, subroutine 600 may be eliminated entirely from the transformation routine 300. Once normals have been generated for each of the voxels, subroutine 600 ends in a block 699.

Figure 7:
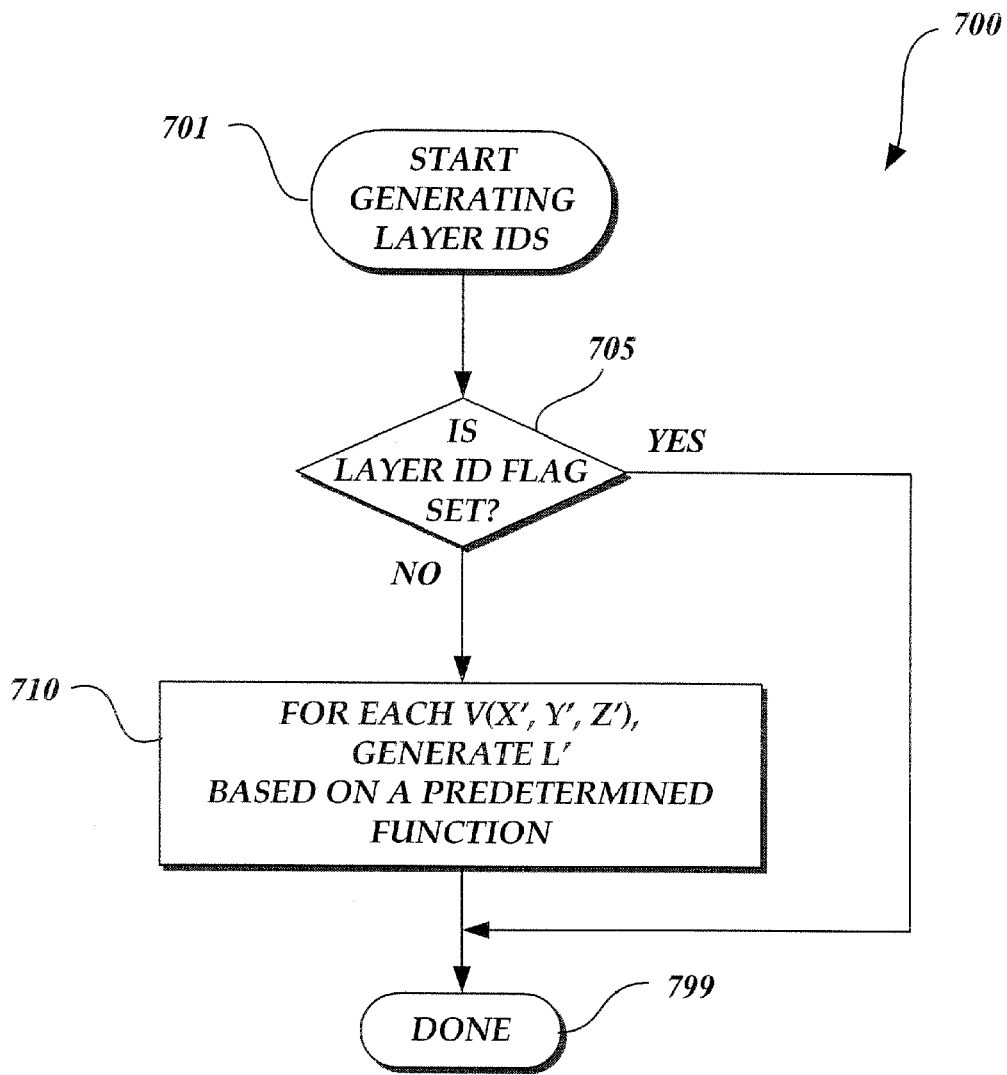
FIG. 7 is a flow diagram illustrating a subroutine for generating layer data for each mapped voxel.

Returning to FIG. 3, following completion of the normals generating subroutine 600, the transformation routine 300 continues to a subroutine 700 for generating layer IDs. Subroutine 700 is shown in more detail in FIG. 7. Subroutine 700 begins in a block 701 and proceeds to a decision block 705 in which it determines if the layer ID flag has been set indicating that the point cloud data included layer data. If so, it is not necessary to generate any layer IDs because the layer IDs would have already been mapped to corresponding voxels. Accordingly, subroutine 700 ends in a block 799. However, if the layer ID flag is not set, this indicates that either the point cloud did not contain layer data or that the layer IDs for each voxel were simply set to a default during the mapping routine 500. Accordingly, in a block 710, a layer ID is generated for each voxel in the voxel set based on a predetermined function. As those skilled in the art will appreciate, a variety of predetermined functions or algorithms deemed suitable or desirable by a developer may be used to generate the layer IDs. For example, the layer ID may be set to a numerical value that represents the corresponding color or rgb value of the voxel. Accordingly, any color that that falls in a certain color range will be mapped to the same layer ID. So, if there is a green portion and a red portion in the same point cloud, all of the mapped voxels in the corresponding voxel set having a green rgb value will be given the same layer ID as the green cloud points and all of the mapped voxels having a red rgb value will be given the same layer ID as the red cloud points. Those skilled in the art will also appreciate that generating a layer ID for each voxel in the voxel set is optional and that in some embodiments of the present invention, subroutine 700 is eliminated entirely from the transformation routine 300. However, if layer data is generated, subroutine 700 ends in a block 799. Returning to FIG. 3, upon completion of subroutine 700, the transformation routine 300 ends in a block 399 resulting in a complete voxel set 120.

While the preferred embodiment of the present invention has been illustrated and described, it will be appreciated that various changes can be made therein without departing from the spirit and scope of the invention. For example, after obtaining the raw point cloud data file in the transformation routine 300, the data points can be filtered, e.g., passed through a low-pass filter, in order to filter out noise present in the data. In yet other embodiments of the present invention, additional attributes may be associated with the points of the point cloud and thus mapped to the voxels of the voxel set. Alternatively, additional attributes not associated with point cloud data could be assigned to voxels after the mapping process. Such attributes may include without limitation viscosity, deformation properties, temperature, assembly properties, etc. In other words, any attribute that may be associated with an object may be assigned to a voxel in order to truly represent realism when rendering the three-dimensional image of the object. Those attributes may be assigned to the voxel during the mapping process, or separately much like the normal and layer ID attributes are set in subroutines 600 and 700. Further, in other embodiments of the present invention the order in which many of the flow chart blocks are described and depicted in the accompanying figures may be altered without departing from the spirit and scope of the present invention.

The embodiments of the invention in which an exclusive property or privilege is claimed are defined as follows:

1. A computer-implemented method for transforming a point cloud into a voxel set, the voxel set requiring less storage space than the point cloud, the point cloud containing an unorganized plurality of points, each point associated with a set of attributes containing at least one attribute, the method comprising:
mapping each point in to unorganized plurality of points and its associated set of attributes to a voxel in the voxel set; and
if multiple points in the unorganized plurality of points map to the same voxel in the voxel set, combining the sets of attributes associated with the multiple points mapped to said voxel into a single set of attributes for said voxel.

2. The method of claim 1, further comprising:
if only one point in the unorganized plurality of points is mapped to a voxel, setting the set of attributes for said voxel to the set of attributes for said point.

3. The method of claim 1, wherein the point cloud is located in a first coordinate system and the voxel set is located in a second coordinate system, and wherein mapping each point in the unorganized plurality of points to a voxel in the voxel set comprises mapping position coordinates of the point in the first coordinate system to position coordinates of the voxel in the second coordinate system.

4. The method of claim 3, wherein mapping position coordinates for the point in the first coordinate system to position coordinates for the voxel in the second coordinate system comprises scaling the position coordinates of the point in the first coordinate system to the position coordinates of the voxel in the second coordinate system.

5. The method of claim 4, wherein the first coordinate system is a floating point-based coordinate system and the second coordinate system is an integer-based coordinate system.

6. The method of claim 3, wherein at least one attribute in the set of attributes associated each point is scaled when the point is mapped to the voxel.

7. The method of claim 6, wherein the at least one attribute that is scaled is intensity.

8. The method of claim 1, wherein similar attributes within the sets of attributes associated with each of the multiple points mapped to said voxel are combined into a single set of attributes for said voxel based on a predetermined function.

9. The method of claim 8, wherein the predetermined function is an averaging function.

10. The method of claim 8, wherein the predetermined function is an override function.

11. The method of claim 1, further comprising:
if the set of attributes associated with the points of the unorganized plurality of points does not contain a predetermined attribute, generating the predetermined attribute for the set of attributes for each voxel of the voxel set.

12. The method of claim 11, wherein the predetermined attribute is a set of normal values.

13. An apparatus for transforming point cloud data into voxel set data, the apparatus comprising:
a constrained memory for storing the point cloud data and voxel set data, the point cloud data comprising a set of unorganized points, the voxel set data requiring less storage space than the point cloud data; and
a standard processing unit coupled to the constrained memory, the processing unit executing program code for transforming the point cloud data into the voxel set data, the program code executed by the standard processing unit transforming the point cloud data into the voxel set data by mapping each point of point cloud data to a voxel of voxel set data, assigning an attribute associated with each point of point cloud data to the voxel to which the point is mapped, and combining the attributes associated with a plurality of points as a single attribute and assigns the single attribute to the voxel if a plurality of points are mapped to the same voxel.

14. The apparatus of claim 13, wherein the program code executed by the standard processing unit maps each point of point cloud data to a voxel of voxel set data by mapping floating point-based position coordinates for each point to integer-based position coordinates for the voxel.

15. The apparatus of claim 14, wherein the program code executed by the standard processing unit scales the floating point-based position coordinates for each point to the integer-based position coordinates for the voxel when mapping the floating point-based position coordinates for each point to integer-based position coordinates for the voxel.

16. The apparatus of claim 13, wherein the program code executed by the standard processing unit assigns the attribute associated with the point mapped to a voxel, if the point is the only point mapped to the voxel.

17. The apparatus of claim 13, wherein the program code executed by the standard processing unit combines a plurality of attributes associated with each point of point cloud data into a single set of attributes and assigns the singe set of attributes to the voxel, if a plurality of attributes are associated with each point of point cloud data and a plurality of points are mapped to the same voxel.

18. The apparatus of claim 13, wherein the program code executed by the standard processing unit scales the attribute assigned to the voxel from the attribute associated with the point mapped to the voxel.

19. The apparatus of claim 18, wherein the scaled attribute is intensity.

20. The apparatus of claim 13, wherein the program code executed by the standard processing unit generates a predetermined attribute for each voxel if the predetermined attribute is not already associated with the points mapped to each voxel.

21. The apparatus of claim 20, wherein the predetermined attribute is a set of normal values.

22. A method for complexity decimation of point cloud data, the point cloud data containing an unorganized plurality of points, each point associated with a set of attributes containing at least one attribute, the method comprising:
    mapping each point in the point cloud and its associated set of attributes to a voxel of volumetric data;
    if multiple points in the point cloud map to the same voxel of volumetric data, creating a less complex set of attributes for said voxel from the sets of attributes associated with the multiple points mapped to said voxel, wherein the less complex set of attributes for a voxel is created by combining similar attributes within the sets of attributes associated with each of the multiple points mapped to said voxel based on a predetermined function; and
    if only one point in the point cloud is mapped to a voxel, setting the set of attributes for said voxel to the set of attributes for said point.

23. The method of claim 22, wherein the point cloud data is located in a first coordinate system and the volumetric data is located in a second coordinate system, and wherein mapping each point in the point cloud data to a voxel of volumetric data comprises mapping position coordinates of the point in the first coordinate system to position coordinates of the voxel in the second coordinate system.

24. The method of claim 23, wherein mapping position coordinates for the point in the first coordinate system to position coordinates for the voxel in the second coordinate system comprises scaling the position coordinates of the point in the first coordinate system to the position coordinates of the voxel in the second coordinate system.

25. The method of claim 24, wherein the first coordinate system is a floating point-based coordinate system and the second coordinate system is an integer-based coordinate system.

26. The method of claim 24, wherein at least one attribute in the set of attributes associated each point is scaled when the point is mapped to the voxel.

27. The method of claim 26, wherein the at least one attribute that is scaled is intensity.

28. The method of claim 22, wherein the predetermined function is an averaging function.

29. The method of claim 22, wherein the predetermined function is an override function.

30. The method of claim 22, wherein the volumetric data to which the point cloud data is mapped has a maximum dimension that depends on a resolution of a display device upon which the volumetric data will be displayed.

31. A computer-readable medium storing computer-executable components for transforming point cloud data into voxel set data, the computer-executable components comprising:
    a scaling component for generating a position scaling factor and a base offset for the point cloud data, the point cloud data comprising a set of unorganized points;
    a mapping component for mapping each point of the point cloud data to a voxel of the voxel set data using the base offset and position scaling factor for the point cloud data; and
    a normals generating component for generating normals associated with each voxel of the voxel set data if the point cloud data does not already contain normals,
    wherein for each point of point cloud data, the mapping component further transfers at least one attribute associated with the point to the voxel to which the point is mapped if said voxel has not yet been transferred any attributes, and
    wherein for each point of point cloud data, the mapping component combines the at least one attribute associated with the point with any similar attributes of prior points mapped to the same voxel and transfers the combined attributes to said voxel, if said voxel has already been transferred attributes.

32. The computer-readable medium of claim 31, wherein for each point of point cloud data, the mapping component maps the point of the point cloud data to a voxel of the voxel set data by determining a position of the voxel in an alternate coordinate system as a function of a position of the point in a first coordinate system, the base offset for the point cloud data and the position scaling factor.

33. The computer-readable medium of claim 31, wherein the mapping component combines the attributes based on a predetermined function.

34. The computer-readable medium of claim 33, wherein the predetermined function is an averaging function.

35. The computer-readable medium of claim 33, wherein the predetermined function is an override function.

36. The computer-readable medium of claim 31, wherein the at least one attribute is intensity.

37. The computer-readable medium of claim 36, wherein the scaling component further generates an intensity scaling factor that is applied to the intensity attribute when the intensity attribute is transferred from the point to the voxel.

38. The computer-readable medium of claim 31, wherein the at least one attribute is color.

39. The computer-readable medium of claim 31, wherein the at least one attribute is a set of normal values.

40. The computer-readable medium of claim 31, wherein the at least one attribute is density.

41. The computer-readable medium of claim 31, wherein the at least one attribute is layer data.

42. The computer-readable medium of claim 31, further comprising a layer data generating component for generating layer data associated with each voxel of the voxel set data if the point cloud data does not already contain layer data.

43. The computer-readable medium of claim 31, wherein the maximum dimension of the voxel set data is based on a resolution of a display device upon which the volumetric data will be rendered.

* * * * *

UNITED STATES PATENT AND TRADEMARK OFFICE
CERTIFICATE OF CORRECTION

PATENT NO. : 7,420,555 B1  Page 1 of 1
APPLICATION NO. : 11/943491
DATED : September 2, 2008
INVENTOR(S) : M. J. Lee It is certified that error appears in the above-identified patent and that said Letters Patent is hereby corrected as shown below:

| COLUMN | LINE | ERROR |
|---|---|---|
| 14 | 62 | "assigns" should read --assigning-- |
| 15 | 16 | "singe" should read --single-- |

Signed and Sealed this

Eighth Day of September, 2009

David J. Kappos
*Director of the United States Patent and Trademark Office*